United States Patent
Kim et al.

(10) Patent No.: US 9,517,706 B2
(45) Date of Patent: Dec. 13, 2016

(54) METHOD AND APPARATUS FOR CONTROLLING AN ELECTRIFIED POWERTRAIN SYSTEM OF A VEHICLE

(71) Applicant: GM GLOBAL TECHNOLOGY OPERATIONS LLC, Detroit, MI (US)

(72) Inventors: Min-Joong Kim, Troy, MI (US); Yo Chan Son, Rochester Hills, MI (US); Norman K. Bucknor, Troy, MI (US); R Travis Schwenke, Springboro, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 14/710,041

(22) Filed: May 12, 2015

(65) Prior Publication Data

US 2016/0332534 A1  Nov. 17, 2016

(51) Int. Cl.
*B60L 15/20* (2006.01)
(52) U.S. Cl.
CPC ................. *B60L 15/2054* (2013.01)
(58) Field of Classification Search
CPC .................................. B60L 15/2054
See application file for complete search history.

(56) References Cited

U.S. PATENT DOCUMENTS

| | | | |
|---|---|---|---|
| 2006/0194670 A1* | 8/2006 | Heap | B60K 6/445 477/3 |
| 2013/0325233 A1* | 12/2013 | Whitney | B60W 20/108 701/22 |
| 2014/0070739 A1* | 3/2014 | Luedtke | B60L 11/08 318/400.02 |
| 2015/0251649 A1* | 9/2015 | Liang | B60L 15/20 701/22 |
| 2016/0211772 A1* | 7/2016 | Degner | H02P 27/08 |

* cited by examiner

*Primary Examiner* — Rodney Butler
(74) *Attorney, Agent, or Firm* — Quinn Law Group, PLLC

(57) ABSTRACT

A method for controlling a powertrain system includes deactivating a motor disconnect clutch during vehicle operation. Motor speed is decreased to a first inactive speed threshold and an inverter circuit is controlled to an inactive state while monitoring the motor speed. The inverter circuit is deactivated, and when the motor speed decreases to a second inactive speed threshold, the inverter circuit is pulse-activated to operate the electric machine to increase motor speed to the first inactive speed threshold, and then deactivated. The inverter circuit is activated to increase the motor speed to synchronize with speed of the driveline prior to activating the motor disconnect clutch.

16 Claims, 3 Drawing Sheets

METHOD AND APPARATUS FOR CONTROLLING AN ELECTRIFIED POWERTRAIN SYSTEM OF A VEHICLE

TECHNICAL FIELD

This disclosure relates to electrified powertrain systems, and control associated therewith.

BACKGROUND

Electric machines, e.g., multi-phase electric motor/generators have stator windings that are energized by alternating current from inverter modules that electrically connect to high-voltage DC electrical power buses. Electric machines may be employed as torque motors to supply torque to a vehicle driveline. Design and operating considerations related to employing electric machines as torque motors in vehicle systems include energy consumption, responsiveness and drivability.

SUMMARY

A powertrain system for a vehicle is described, and includes an electric machine that is mechanically rotatably couplable to a driveline via a motor disconnect clutch. A method for controlling the powertrain system includes deactivating the motor disconnect clutch during vehicle operation. Motor speed of the electric machine is decreased to a first inactive speed threshold and an inverter circuit is controlled to an inactive state while monitoring the motor speed. The inverter circuit is deactivated, and when the motor speed decreases to a second inactive speed threshold, the inverter circuit is pulse-activated to operate the electric machine to increase motor speed to the first inactive speed threshold, and then deactivated. The inverter circuit is activated to increase the motor speed to synchronize with speed of the driveline prior to activating the motor disconnect clutch.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
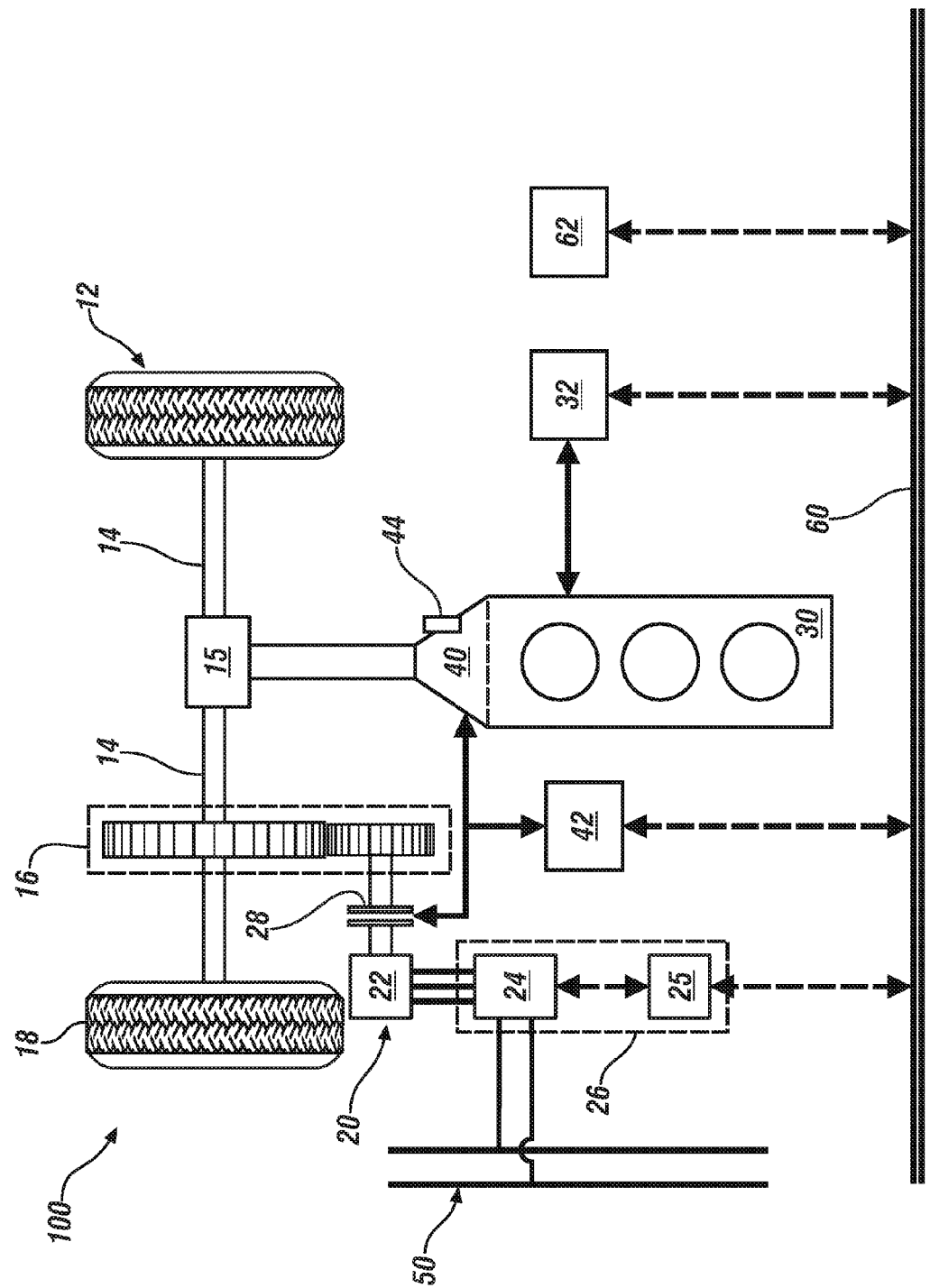
FIG. 1 schematically illustrates a vehicle including a multi-mode powertrain system that includes an internal combustion engine, transmission, and electric machine capable of supplying torque to a driveline through a gear train and a motor disconnect clutch, in accordance with the disclosure.

Referring now to the drawings, wherein the depictions are for the purpose of illustrating certain embodiments only and not for the purpose of limiting the same, FIG. 1 schematically illustrates a first embodiment of a vehicle 100 including a multi-mode powertrain system 20 that includes an internal combustion engine (engine) 30 and transmission 40 capable of supplying torque to a driveline 12 and an electric machine 22 capable of supplying torque to the driveline 12 through a gear train 16 including a selectively activatable motor disconnect clutch 28. Like numerals refer to like elements in the various figures. The multi-mode powertrain system 20 is one embodiment that is shown for purposes of illustration. The concepts described herein may apply to any powertrain system that includes an electric machine 22 capable of supplying torque to the driveline 12 through a gear train 16 including a selectively activatable motor disconnect clutch 28.

The engine 30 is capable of supplying torque to the driveline 12 through the transmission 40, and may be any suitable internal combustion engine design and configuration. An engine controller 32 communicates with various sensors of the engine 30 and the vehicle 100, and commands states of various actuators of the engine 30 to control operation thereof in response to operator commands, including, e.g., an operator request for power.

The transmission 40 may be a fixed-gear step transmission capable of transferring torque between the engine 30 and the driveline 12 in one embodiment. Alternatively, the transmission 40 may be a continuously variable transmission, an electrically-variable transmission, or another suitable torque-transmitting device. A transmission controller 42 communicates with various sensors of the transmission 40 and the vehicle 100, and commands states of various actuators of the transmission 40 to control operation of the transmission in response to operator commands, including, e.g., the operator request for power. One of the sensors includes a rotational speed sensor 44 that generates a signal that can be translated to vehicle speed. The transmission controller 42 controls activation and deactivation of the motor disconnect clutch 28 as described herein.

The electric machine 22 may be a multi-phase permanent magnet electric motor/generator, or alternatively, any suitable electric motor/generator. The electric machine 22 preferably includes a stator and a rotor, wherein the rotor mechanically rotatably couples to the gear train 16 when the motor disconnect clutch 28 is in a first, activated state. The electric machine 22 is equipped with a rotational speed sensor to monitor motor speed, e.g., a resolver or another suitable device. The term "motor speed" indicates the rotational speed of the rotor of the electric machine 22.

The gear train 16 includes first and second meshingly engaged members, with the first member rotatably coupled to one element of the motor disconnect clutch 28 and the second member rotatably coupled to one of the axles 14 of the drive wheels 18. The gear train 16 is preferably arranged as a direct-drive fixed-gear configuration, with rotational speeds based upon a gear ratio of the first and second meshingly engaged members of the gear train 16. The gear train 16 mechanically rotatably couples the electric machine 22 to the driveline 12 to provide propulsion torque thereto when the motor disconnect clutch 28 is activated. The driveline 12 mechanically rotatably couples to the first member of the gear train 16, and the electric machine 22 mechanically rotatably couples to the second member of the gear train 16 via a second element of the motor disconnect clutch 28 when the motor disconnect clutch 28 is in a first, activated state. Alternatively, the gear train 16 may include a direct-drive fixed-gear configuration wherein the first and second members are sprockets that are rotatably coupled via a chain. Alternatively, the gear train 16 may include a direct-drive fixed-gear configuration wherein the first and second members are pulleys that are rotatably coupled via a belt.

The driveline 12 includes either a single one or a pair (as shown) of drive wheels 18 coupled to axles 14 that mechanically rotatably couple via a differential 15.

The motor disconnect clutch 28 is a controllable torque transfer device that may be controlled to either of a first, activated state or a second, deactivated state in response to a command from a controller, e.g., the transmission controller 42. The motor disconnect clutch 28 is selectively activatable, and is capable of mechanically coupling rotations of the electric machine 22 and the gear train 16 when commanded to the first, activated state, and decoupling rotation of the electric machine 22 from rotation of the gear train 16 when commanded to the second, deactivated state.

As such, torque generated by the electric machine 22 drives rotation of the drive wheels 18 of the driveline 12 when operating the electric machine 22 in a propulsion state and torque generated by the rotation of the drive wheels 18 of the driveline 12 due to vehicle momentum drives rotation of the electric machine 22 under specific operating conditions, including when operating the electric machine 22 in a regenerative braking state.

A power inverter module 26 controls electric power flow to the electric machine 22. The power inverter module 26 in this embodiment includes a multi-phase inverter circuit 24 and an inverter controller 25. The multi-phase inverter circuit 24 electrically connects to a high-voltage DC power source via a high-voltage DC power bus 50 that includes a positive bus element and a negative bus element. In one embodiment, the high-voltage DC power source supplies DC electric power that is near 300V. The high-voltage DC power source can include a high-voltage electrical energy storage device, e.g., a high-voltage battery or a capacitor, a high-voltage electric power generator or another related device or system. The multi-phase inverter circuit 24 includes a plurality of switch pairs that electrically connect in series across the elements of the high-voltage DC power bus 50. Each switch of the switch pairs may be a power transistor, e.g., an Insulated Gate Bipolar Transistor (IGBT), or another suitable power transistor. Each of the switch pairs corresponds to a phase of the electric machine 22. The multi-phase inverter circuit 24 preferably includes other electrical components including capacitors, resistors and other electrical circuit components to accomplish functions related to electrical noise suppression, load balancing and the like.

High-voltage as used herein is understood to mean nominal voltage levels used primarily in propulsion applications for the vehicle, e.g., for high-voltage electric machines). Low-voltage as used herein is understood to mean nominal voltage levels used primarily in low voltage accessory loads for the vehicle, e.g., for high-voltage electric machines). More generally, as used herein, high-voltage and low-voltage are understood to mean nominal voltage levels relative to each other.

The inverter controller 25 communicates with each of the switches of the multi-phase inverter circuit 24 to control operation thereof, with control commands generated in response to commands from the powertrain controller (HCP) 62.

The powertrain controller (HCP) 62 signally communicates with the inverter controller 25, engine controller 32 and transmission controller 42 via a communications bus 60, which is a controller area network (CAN) bus in one embodiment. The HCP 62 coordinates control of the multi-mode powertrain system 20, including providing operating and control commands to each of the inverter controller 25, engine controller 32 and transmission controller 42 in response to an operator request for power.

The multi-mode powertrain system 20 supplies torque to the driveline 12 for vehicle propulsion, with torque contributions from either or both the engine 30 and the electric machine 22. When operating in a low vehicle speed zone, the selectively activatable motor disconnect clutch 28 is always activated, and torque is supplied to the driveline 12 through the electric machine 22 in concert with the engine 30. This may include powertrain speed/load operating points whereat the engine 30 may be commanded to an OFF state in some embodiments, with driveline torque exclusively supplied by the electric machine 22. The low vehicle speed zone may have an upper threshold, e.g., less than 55 kph.

When operating in a mid-range vehicle speed zone, the motor disconnect clutch 28 may be selectively activated under specific conditions to supplement torque supplied through the engine 30, e.g., under acceleration conditions for additional torque or under deceleration conditions for regenerative braking. Other times, the motor disconnect clutch 28 may be selectively deactivated. The mid-range vehicle speed has a maximum speed threshold, e.g., 130 kph.

When the vehicle 10 operates in a high vehicle speed zone, which includes speeds greater than the maximum speed threshold associated with the mid-range vehicle speed zone, the motor disconnect clutch 28 is deactivated, and all torque is supplied to the driveline 12 through the engine 30. The maximum speed threshold is selected based upon the torque and speed capability of the electric machine 22, including operating to minimize risk of the electric machine 22 entering an uncontrolled generating (UCG) mode when operating in a free-wheeling, no-load condition. The UCG mode may occur during specific operating conditions, including high-speed, low or no load conditions, when the electric machine 22 operates such that motor back-emf increases, resulting in a motor output voltage that is greater than voltage on the high-voltage bus. The excess output voltage may result in a charging current flow through one or more of the diodes arranged in parallel to the switches of the inverter to the high-voltage battery. The charging current flow occurring in the UCG mode may result in excess current through components of the inverter or overcharging of the high-voltage battery that can negatively affect service life of the inverter or the high-voltage battery.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds during ongoing operation. Communications between controllers and between controllers, actuators and/or sensors may be accomplished using a direct wired link, a networked communications bus link, a wireless link or any another suitable communications link.

Figure 2:
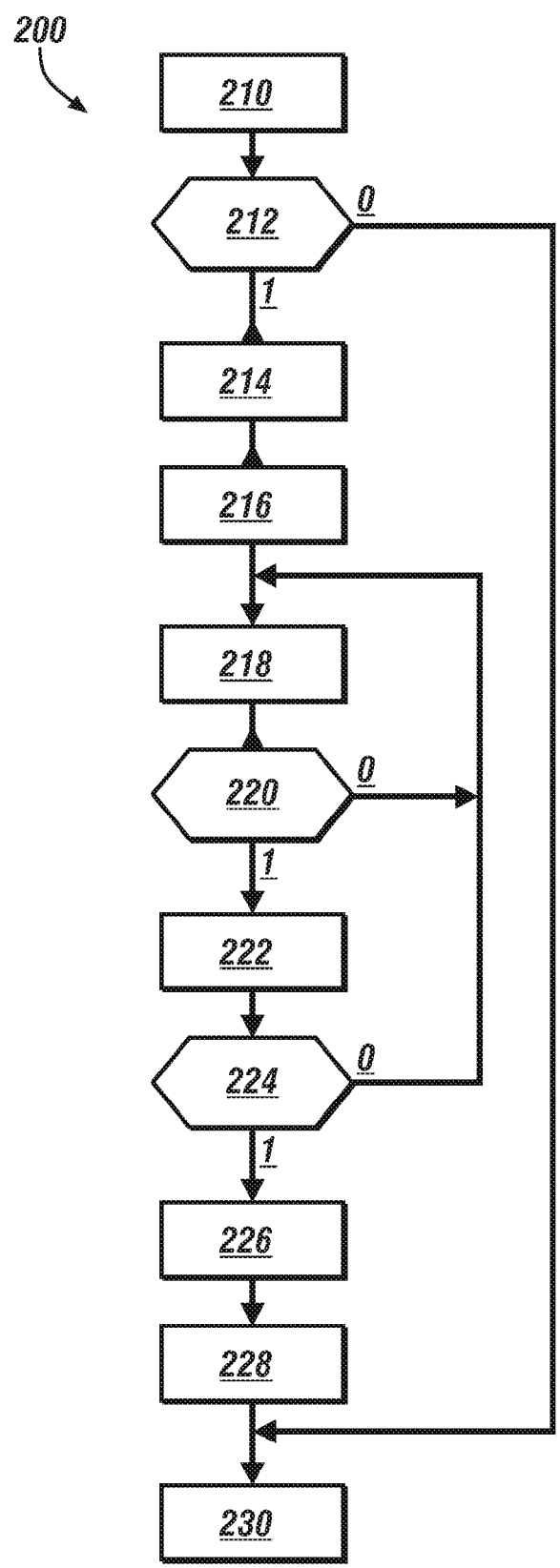
FIG. 2 schematically shows a motor control process for controlling motor speed of an electric machine that selectively rotatably couples to a vehicle driveline through an activatable motor disconnect clutch, in accordance with the disclosure.

FIG. 2 schematically shows a motor control process 200 for controlling motor speed of an electric machine that selectively rotatably couples to a vehicle driveline through an activatable motor disconnect clutch. The motor control process 200 is described in context of an embodiment of the vehicle 100 including the multi-mode powertrain system 20 described with reference to FIG. 1, which is a non-limiting embodiment provided for purposes of illustrating the concepts of the motor control process 200. It is appreciated that the motor control process 200 may be implemented on any suitable powertrain system that employs a selectively activatable motor disconnect clutch that is capable of mechanically coupling rotations of an electric machine and a gear train when in a first, activated state and capable of decoupling rotation of the electric machine from rotation of the gear train when in a second, deactivated state. Table 1 is provided as a key wherein the numerically labeled blocks and the corresponding functions are set forth as follows, corresponding to the motor control process 200.

TABLE 1

| BLOCK | BLOCK CONTENTS |
|---|---|
| 210 | Monitor engine, electric machine, and powertrain operation |
| 212 | Is motor disconnect clutch commanded to a deactivated state? AND is vehicle speed greater than a minimum vehicle speed? |
| 214 | Decrease motor speed of electric machine to a first threshold speed |
| 216 | Control inverter circuit to an inactive state |
| 218 | Monitor motor speed |
| 220 | Is motor speed less than second threshold speed? |
| 222 | Increase motor speed to the first threshold speed |
| 224 | Is there a command to activate the motor disconnect clutch? |
| 226 | Increase motor speed to synchronize with the driveline speed through the gear train |
| 228 | Activate the motor disconnect clutch |
| 230 | End |

The motor control process 200 may be periodically executed as a control routine or a plurality of control routines that execute as follows. Operations of the vehicle 100 including the engine 30 and the powertrain system 20 are monitored (210). This can include periodic monitoring of sensors and actuators that are associated with the various components and systems of the vehicle 100, powertrain system 20 and engine 30, including by way of example, vehicle speed, engine or transmission speed, and a commanded one of the activation and deactivation states of the motor disconnect clutch 28.

Monitoring includes monitoring actuator commands, including determining whether the motor disconnect clutch has been commanded to an opened or deactivated state (212). In one embodiment, this may include commanding the motor disconnect clutch 28 to an opened or deactivated state when vehicle speed (Vss) is greater than a minimum threshold vehicle speed. By way of example, the minimum threshold vehicle speed may be associated with a minimum speed to enter the mid-range vehicle speed zone wherein the motor disconnect clutch 28 may be selectively activated under specific conditions to supplement torque supplied through the engine 30, e.g., under acceleration conditions for additional torque or under deceleration conditions for regenerative braking. Alternatively, the motor disconnect clutch 28 may have been commanded to an opened or deactivated state associated with operation to reduce spin-loss. When either of these conditions has not been met (212)(0), this iteration of the motor control process 200 ends (230). When the motor disconnect clutch 28 has been commanded to the deactivated state with vehicle speed (Vss) greater than the minimum threshold vehicle speed (212)(1), the inverter controller 25 may command the inverter circuit 24 to control the electric machine 22 to reduce its rotational speed to a target inactive motor speed (214). The target inactive motor speed is preferably a motor speed that is less than or equal to a maximum allowable motor speed threshold to prevent operating the electric machine 22 in the UCG mode and is selected to minimize risk of the electric machine 22 entering the UCG mode when operating in a free-wheeling, no-load condition.

Controlling the electric machine 22 to reduce its rotational speed includes the inverter controller 25 commanding the inverter circuit 24 to operate the electric machine 22 in a regenerative mode to generate a low level of reactive torque, thus slowly decelerating the electric machine 22 to the target inactive motor speed, which may be in the order of magnitude of 250-500 ms.

When the electric machine 22 achieves the target inactive motor speed, the inverter controller 25 commands the inverter circuit 24 to an inactive state, including opening transistors of the inverter circuit 24 in a manner that allows the electric machine to freewheel (216) while monitoring the motor speed (218).

When the motor speed decreases to a minimum inactive motor speed (Nmin) (220)(1), the inverter controller 25 pulse-activates the inverter circuit 24 to increase the motor speed to the target inactive motor speed (222). Otherwise (220)(0), the inverter controller 25 monitors the motor speed (218). The minimum inactive motor speed is selected based upon a balance between minimizing electric power costs to operate the electric machine 22 and having the electric machine 22 operating at a rotational speed that minimizes response time to synchronize the elements of the motor disconnect clutch 28 when it is subsequently activated.

When there is a command to activate the motor disconnect clutch 28 while the electric machine 22 is operating in the range associated with the target inactive motor speed (224)(1), the inverter controller 25 controls the inverter circuit 24 to increase the motor speed of the electric machine 22 to synchronize then activate the elements of the motor disconnect clutch 28 (226, 228).

Figure 3:
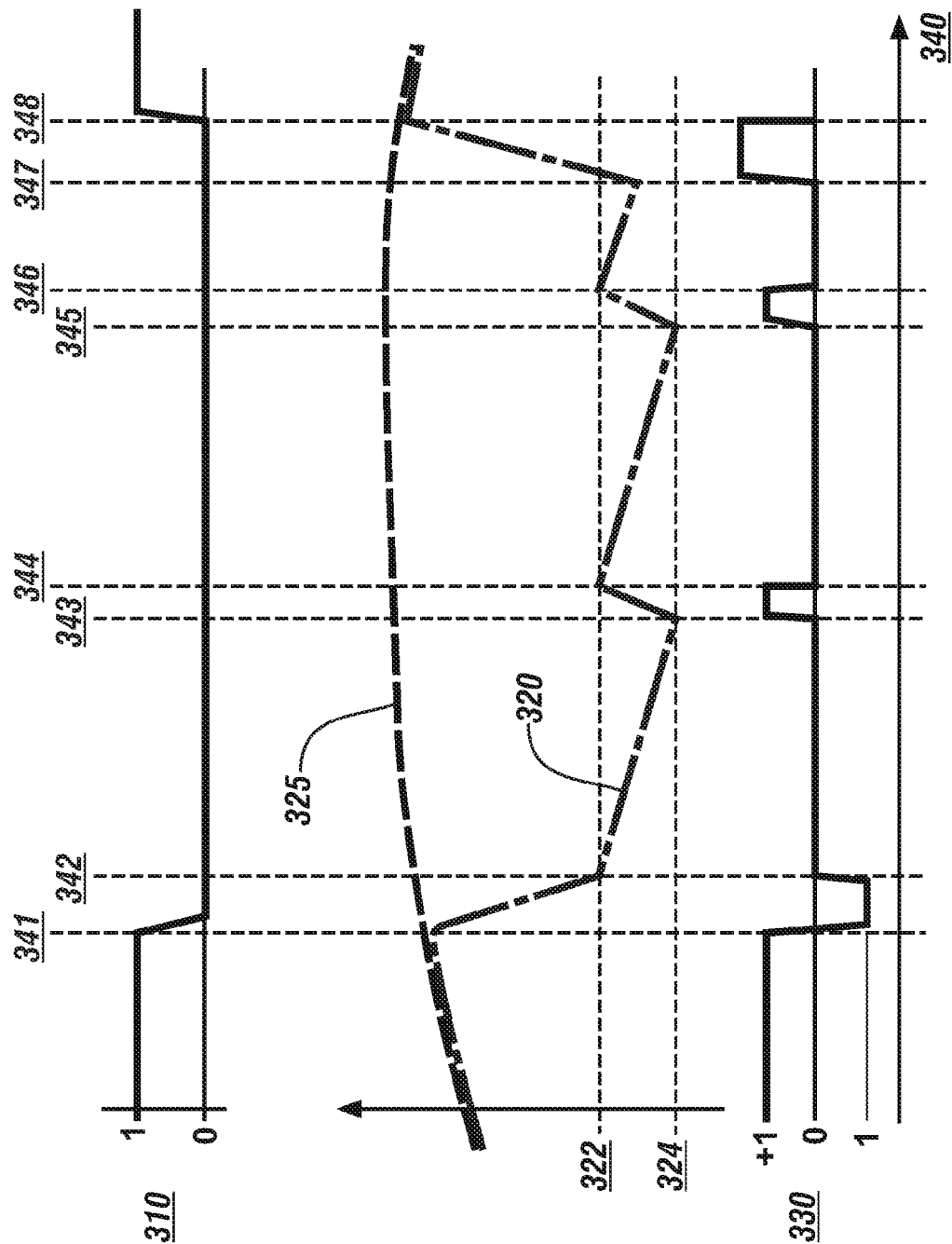
FIG. 3 graphically shows time-based parameters associated with execution of the motor control process described with reference to FIG. 2 on an embodiment of the vehicle described with reference to FIG. 1, in accordance with the disclosure.

FIG. 3 graphically shows time-based parameters associated with execution of the motor control process 200 on an embodiment of the vehicle 100 including the engine 30 and the powertrain system 20. The parameters include motor disconnect clutch activation command 310, motor speed 320, axle speed 325, and motor torque command 330, all in relation to elapsed time 340, which is shown on the horizontal axis.

Prior to timepoint 341, the motor disconnect clutch activation command 310 is high (1) indicating the motor disconnect clutch 28 is activated, the motor torque command 330 is positive (+1), indicating the electric machine 22 is operating in a torque generating mode, and the motor speed 320 and axle speed 325 are increasing.

At timepoint 341, the motor disconnect clutch activation command 310 is low (0), indicating the motor disconnect clutch 28 is deactivated. The motor speed 320 is greater than a target inactive motor speed 322. Thus, the motor torque command 330 becomes negative (−1), indicating the electric machine 22 is operating in a torque reacting mode to decrease the motor speed 320. The axle speed 325 continues to increase when the motor disconnect clutch 28 is deactivated. At timepoint 342, the motor speed 320 decreases to the target inactive motor speed 322. Thus, the motor torque command 330 becomes neutral (0), indicating the electric machine 22 is in a freewheeling mode, or gliding mode. The motor speed 320 continues to decrease thereafter. At timepoint 343, the motor speed 320 decreases to a minimum inactive motor speed 324. Thus, the motor torque command 330 becomes positive (+1) for a short pulse period, causing the electric machine 22 to increase speed until it reaches the target inactive motor speed 322 at timepoint 344, at which point, the motor torque command 330 becomes neutral again (0). This process may continue indefinitely, as shown at timepoints 345 and 346. At timepoint 347, a command is received to activate the motor disconnect clutch 28, causing the motor torque command 330 to become positive (+1) to synchronize the elements of the motor disconnect clutch 28, which includes increasing the motor speed 320 to a speed that is equal to the axle speed 325. At timepoint 348, the motor speed 320 synchronizes with the axle speed 325, and the motor disconnect clutch activation command 310 is commanded high (1), indicating the motor disconnect clutch 28 is to activate.

The motor control process 200 for controlling motor speed of an electric machine that selectively rotatably couples to a vehicle driveline through an activatable motor disconnect clutch may be advantageously employed to reduce synchronization delay times, including on systems employing gear trains having high gear ratios, e.g., at or near ratios of 26:1 and more. In one exemplary system, a gear ratio of 26:1 may translate to a motor speed of 8600 RPM when the vehicle is operating at 40 kph. Thus, a synchronization process that starts at a motor speed in the range of 1000 RPM to 2500 RPM may be more responsive than when starting at a motor speed near 0 RPM. This system can further mitigate against objectionable motor noise during clutch synchronization.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a vehicle powertrain system including an electric machine mechanically rotatably couplable to a driveline via a motor disconnect clutch, the method comprising:
   deactivating the motor disconnect clutch during vehicle operation;
   decreasing motor speed of the electric machine to a first inactive speed threshold;
   controlling an inverter circuit to an inactive state and monitoring the motor speed;
   deactivating the inverter circuit;
   monitoring the motor speed;
   pulse-activating the inverter circuit to operate the electric machine to increase the motor speed to the first inactive speed threshold when the motor speed has decreased to a second inactive speed threshold and then deactivating the inverter circuit; and
   activating the inverter circuit to increase the motor speed to synchronize with a speed of the driveline and then activating the motor disconnect clutch.

2. The method of claim 1, wherein decreasing the motor speed to a first inactive speed threshold comprises controlling the inverter circuit to control the electric machine to decrease the motor speed to a first inactive speed threshold.

3. The method of claim 1, wherein decreasing the motor speed to a first inactive speed threshold comprises decreasing the motor speed to a maximum allowable speed threshold to prevent operating the electric machine in an uncontrolled generator mode.

4. The method of claim 1, wherein the second minimum inactive speed comprises a motor speed that minimizes a response time for synchronizing elements of the motor disconnect clutch when subsequently activated.

5. The method of claim 1, wherein controlling the inverter circuit to an inactive state comprises controlling the inverter circuit to permit the electric machine to free-wheel.

6. A method for controlling a multi-mode powertrain system including an electric machine mechanically rotatably couplable to a gear train coupled to a driveline via a controllable activatable motor disconnect clutch in response to a command to deactivate the motor disconnect clutch, the method comprising:
   deactivating the motor disconnect clutch,
   controlling an inverter circuit to decrease a motor speed of the electric machine to a first inactive speed threshold,
   controlling the inverter circuit to an inactive state and monitoring the motor speed,
   deactivating the inverter circuit,
   monitoring the motor speed, and
   pulse-activating the inverter circuit to operate the electric machine to increase motor speed to the first inactive speed threshold and then deactivating the inverter circuit when the motor speed has decreased to a second minimum inactive speed threshold.

7. The method of claim 6, wherein controlling the inverter circuit to decrease the motor speed to a first inactive speed threshold comprises decreasing the motor speed to a maximum allowable speed threshold to prevent operating the electric machine in an uncontrolled generator mode.

8. The method of claim 6, wherein the second minimum inactive speed comprises a motor speed that minimizes a response time for synchronizing elements of the motor disconnect clutch when subsequently activated.

9. The method of claim 6, wherein controlling the inverter circuit to an inactive state comprises controlling the inverter circuit to permit the electric machine to free-wheel.

10. The method of claim 6, further comprising activating the inverter circuit in response to a command to activate the motor disconnect clutch to increase the motor speed to synchronize with a driveline speed prior to activating the motor disconnect clutch.

11. A powertrain system for propelling a vehicle, comprising:
   an electric machine mechanically rotatably couplable to a driveline via a controllable motor disconnect clutch;
   an inverter circuit electrically connecting a high-voltage DC power bus to the electric machine;
   an inverter controller controlling the inverter circuit;
   a controller, executing a control routine for controlling the powertrain system, including deactivating the motor disconnect clutch in response to a command to deactivate the motor disconnect clutch, wherein the control routine includes the following steps:
controlling the inverter circuit to decrease motor speed of the electric machine to a first inactive speed threshold,
controlling the inverter circuit to an inactive state and monitoring the motor speed,
deactivating the inverter circuit,
monitoring the motor speed, and
when the motor speed decreases to a second minimum inactive speed threshold, pulse-activating the inverter circuit to operate the electric machine to increase the motor speed to the first inactive speed threshold, and then deactivating the inverter circuit.

12. The powertrain system of claim 11, wherein the electric machine mechanically rotatably couplable to the driveline via the controllable motor disconnect clutch further comprises the electric machine mechanically rotatably couplable to a gear train coupled to the driveline via the controllable motor disconnect clutch.

13. The powertrain system of claim 11, wherein controlling the inverter circuit to decrease the motor speed to a first inactive speed threshold comprises decreasing the motor speed to a maximum allowable speed threshold to prevent operating the electric machine in an uncontrolled generator mode.

14. The powertrain system of claim 11, wherein the second minimum inactive speed comprises a motor speed that minimizes a response time for synchronizing elements of the motor disconnect clutch when subsequently activated.

15. The powertrain system of claim 11, wherein controlling the inverter circuit to an inactive state comprises controlling the inverter circuit to permit the electric machine to free-wheel.

16. The powertrain system of claim 11, further comprising activating the inverter circuit in response to a command to activate the motor disconnect clutch to increase the motor speed to synchronize with a driveline speed prior to activating the motor disconnect clutch.

* * * * *